MEMORY CIRCUITRY FOR DIGITAL DATA

Filed Oct. 28, 1957 2 Sheets-Sheet 1

INVENTOR.
ROBERT C. MINNICK
BY Henry L. Hansen
ATTORNEY

INVENTOR.
ROBERT C. MINNICK
BY Henry L. Hanson
ATTORNEY 3,110,015
Patented Nov. 5, 1963

3,110,015

MEMORY CIRCUITRY FOR DIGITAL DATA

Robert C. Minnick, Arcadia, Calif., assignor to Minneapolis-Honeywell Regulator Company, Minneapolis, Minn., a corporation of Delaware Filed Oct. 28, 1957, Ser. No. 692,869
8 Claims. (Cl. 340—174)

A general object of the present invention is to provide a new and improved digital data storage apparatus. More specifically, the present invention is concerned with a digital data storage apparatus of the high speed random access type which utilizes bistable storage elements in a storage matrix wherein said apparatus is characterized by its adaptability for simultaneous access to a plurality of storage positions in the storage matrix.

High speed data storage matrices are widely used in electronic data processing equipment for the storing of digital information. These storage matrices frequently comprise bistable storage elements arranged in an array with the storage elements being individually and selectively settable to one or the other of two stable states. By way of definition, the bistable states of the storage element may be utilized for the storing of a binary one or a binary zero. Thus a storage element which is in the set state may be considered as storing a binary one. If the storage element is in the reset state it may be considered as storing a binary zero.

One form of storage matrix well known in the art is a coincident current type memory using magnetic material having a rectangular hysteresis characteristic with a substantial residual flux or remanence characteristic. J. W. Forrester has described such a coincident current memory in the Journal of Applied Physics, 1951, volume 22, page 44. In this type of memory, the magnetic material may take the form of toroidal cores which are generally arranged in a square or rectangular plane or array. Further, a number of planes may be used together to form a three dimensional array. The discussion which follows is primarily in terms of a single plane but the principles are applicable to the three dimensional array. The selection of any one core in the array may be made by the simultaneous application of a half select current to a horizontal and a vertical selection wire common to the core selected. The presence of the half select current on two select wires common to the core will produce a field of sufficient magnitude to switch the core from one stable state to the other if the core was not already switched to that state. When a particular core has been selected and switched, the resultant flux change in the core may be detected by a sense winding or sense wire which threads all of the cores. The selection in an array of this type is limited to a single core at any one instant.

Electronic data processing machines are frequently organized with a high speed random access type memory. The coincident current memory is particularly adapted for use with high speed electronic computers and data handling circuits which perform arithmetic and other data handling functions. These memories are used for storing programs to be performed as well as the operands or other data which are to be manipulated. The aforementioned concident current type memory is suitable in many types of data processing machines where the speed of access does not unduly limit the speed with which the overall circuitry operates.

It has been found that certain types of high speed processing operations in data processing machines may be "memory limited" when performing certain types of data processing problems. Consequently, the increasing of the speed of access to the memory becomes an important factor in improving the operation of the overall apparatus. One way of improving the speed of operation of a memory of the coincident current type is to arrange the circuitry so that information may be inserted into or removed from several independently related points in the memory simultaneously. This has been achieved in the present invention by a novel arrangement of select and sense windings in a storage array such that a number of bits from any particular array may be simultaneously selected without interference with other information stored in the array.

It is therefore a further more specific object of the present invention to provide a multiple element storage array comprising select and sense circuitry associated with the array which is adapted to simultaneously select multiple bits of information from the array.

The simultaneous selection of data from an array may be achieved by the use of rectangular selection windings heretofore used in combination with additional sets of wires which may be defined as compatible sets. In an article by R. C. Minnick and R. L. Ashenhurst entitled, "Multiple Coincidence Magnetic Storage Systems," Journal of Applied Physics, May 1955, pages 575–579, the theory of compatible sets is fully discussed. A compatible set as used herein implies that one and only one core in each row and column is intersected by a wire from each set and that the slope of each wire of the set as it threads the array is the same. In theory, the use of compatible sets will permit the simultaneous selection of as many cores as desired in an array at any one instance.

In accordance with a preferred embodiment of the invention, a rectangular array is provided with the usual horizontal and vertical selection wires. In addition, there are provided compatible sets of wires for the cores of the array. The selection wires are so arranged that when a simultaneous read is made for any two cores in the array, four cores will actually be read out into an associated storage circuit. The four cores which are selected will be the cores located at the intersecting points of the two horizontal select wires and the two vertical select wires. In order to write into the desired core locations, the write-in is effected such that the write-in will be on the four cores located at the intersecting points of two activated vertical select wires and two activated rectangular select wires. To facilitate this write-in, an additional winding is provided which threads all of the cores while the actual control of the write-in will be determined by the signals applied to the wires of the compatible sets associated with the cores.

It is accordingly another more specific object of the present invention to provide a storage array having address select windings associated therewith in combination with one or more compatible sets of wires positioned with respect to the cores of the array such that data may be read into two or more cores of the array simultaneously.

Under certain types of selections, it is possible that one output wire of a compatible set might intersect two cores which correspond to the cores which are to be selected. To eliminate the resulting superposition of signals produced by such a selection, a further compatible set is provided which set has a slope equal to that of the first set but of opposite sign. By appropriately designing the external circuitry the presence of this unwanted selection may be recognized and eliminated.

Still another more specific object of the invention is then to provide a new and improved storage array having compatible sets of sense windings and control windings in combination with a further compatible set whose slope is the same as that of the first mentioned set but of opposite sign so as to provide means for eliminating signals resulting from signal superposition when predetermined data selections are made in the array.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figures 1, 2:
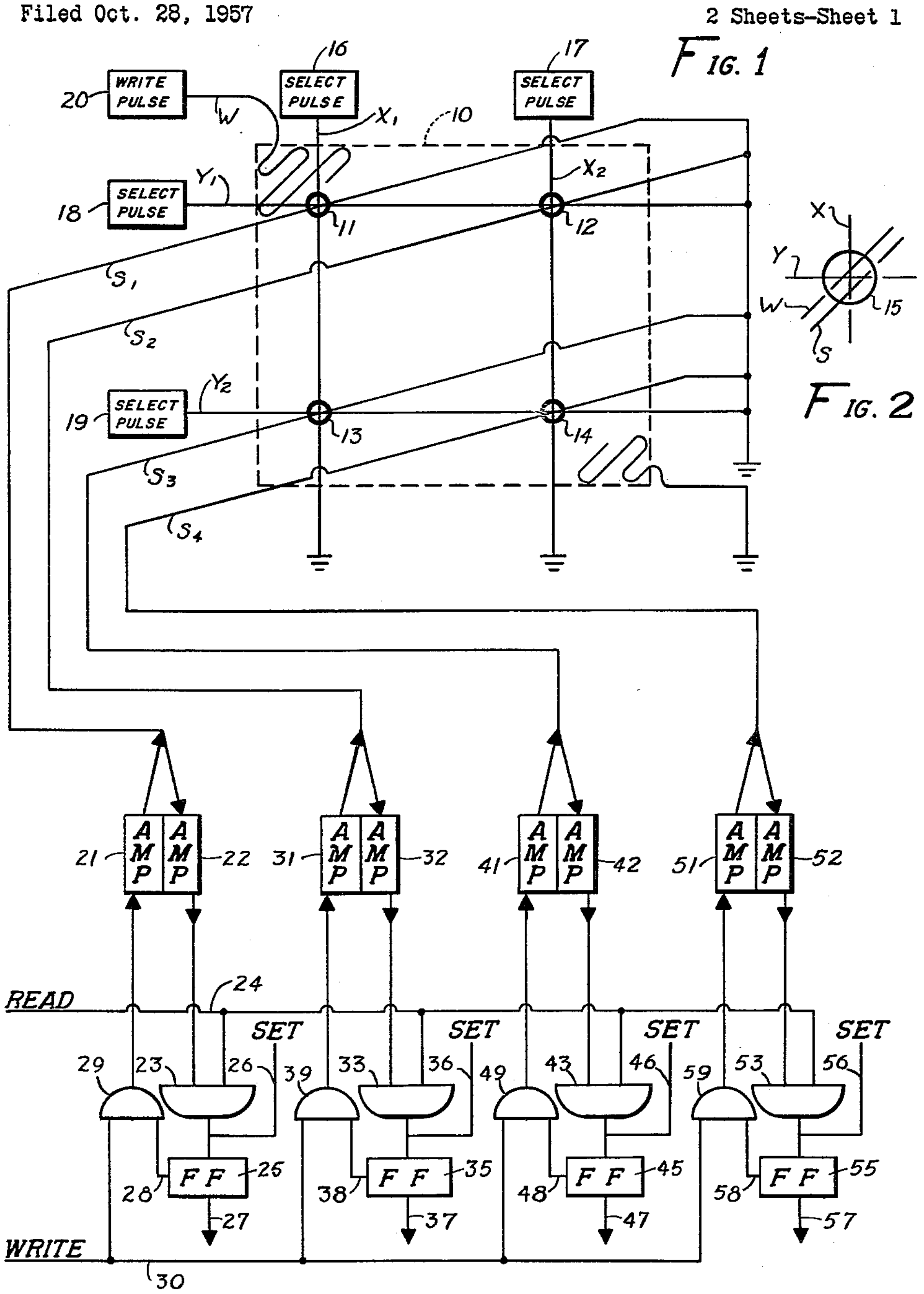
FIGURE 1 illustrates diagrammatically one form of the data storage matrix incorporating the principles of the present invention.
FIGURE 2 illustrates a single storage element and the wires associated therewith.

Referring first to FIGURE 1, the numeral 10 represents a storage matrix which may be of the same basic type disclosed in the aforementioned article by J. W. Forrester. The present storage matrix is assumed to be comprised of a series of magnetic core elements each of which is capable of assuming one of two stable states as defined by the residual hysteresis characteristic of the material used. It will be appreciated that the principles may be applied to preformed core materials, deposited core materials or other materials or elements capable of assuming one or the other of two separate stable states. The storage matrix 10 is assumed to comprise a large number of cores arranged in horizontal or vertical rows. For the purpose of simplifying the illustration of the present invention, only four cores are shown and these are identified by the numerals 11, 12, 13 and 14. Associated with each of the core elements are a plurality of wires which are adapted to supply the signals necessary for the reading and writing of information with respect to each of the core elements.

Referring to FIGURE 2, there is here illustrated a single core element 15, of the type which could be a part of the array 10, having four wires passing through the core in order to effect the desired switching of the core from one to the other of its bistable states. The horizontal selection wire X passes through the core and a vertical select wire Y also passes through the core. In addition, a write wire W passes through the core along with a wire S which is one of a series of wires forming a compatible set.

In order to write information into the core 15, it is assumed that the core is initially in its reset or "zero" state. In order to place the core 15 in its set or "one" state it is necessary that the horizontal and vertical select wires each carry a half select current and the polarity of the current on the two wires is assumed to be minus. Further the write wire W is assumed to have a plus one-half select current applied thereto. The setting of the core 15 may then be controlled by the current applied to the wire S. Thus the setting of the core 15 may be accomplished by applying a minus one-half select current to the wire S so that the sum of the current passed through the core 15 will be minus one. With this current flowing, the core will be switched to the set or "one" state.

Once the core 15 is in the set state it may be switched back to the reset state or read by applying a select current to the horizontal and vertical select wires X and Y. Thus to read the core 15, a plus one-half select current is applied to the wire X and another plus one-half select current is applied to the wire Y so that a full unit of select current will be applied and the core 15 will be switched back to its reset state. When the core is switched back to the reset state from the set state a signal will be induced in the wire S and this signal may be sensed by the circuitry as illustrated in FIGURE 1.

Referring again to FIGURE 1, the core 11 will be seen to be positioned at the intersection of the horizontal select wire $X_1$ and the vertical select wire $Y_1$. The core 12 is positioned at the intersection of the horizontal wire $X_2$ and the vertical select wire $Y_1$. The core 13 is positioned at the intersection of the horizontal select wire $X_1$ and the vertical select wire $Y_2$. Further the core 14 is positioned at the intersection of the horizontal select wire $X_2$ and the vertical select wire $Y_2$. The write pulse wire W is arranged as a single wire which threads all of the cores of the array 10.

The wires of the illustrated compatible set are the wires $S_1$, $S_2$, $S_3$ and $S_4$, said wires passing through the cores 11, 12, 13 and 14 respectively. As defined above, these wires are arranged so that one and only one core in each row and column is intersected by a wire from each set and the slopes of the wires in the array are the same.

The energizing signals for the horizontal select wires $X_1$ and $X_2$ are by way of a pair of select pulse sources 16 and 17. These select pulse sources are appropriately connected to an address selection circuit not shown, which is well known in the art, for selecting one or more lines for activation in accordance with the desired location or address of data in the array 10.

The vertical selection wires $Y_1$ and $Y_2$ are adapted to be energized by a suitable pair of select pulse sources 18 and 19, the latter also deriving their activation from a suitable selection circuit not shown.

The signal for the write wire W is derived from the write pulse source 20, the latter being adapted for energization whenever a writing operation is to take place in the array 10.

The wires $S_1$, $S_2$, $S_3$ and $S_4$ of the compatible set serve as the input and output wires for the cores illustrated. Thus the wire $S_1$ leads to a pair of amplifiers 21 and 22. The amplifier 21 is considered as the write amplifier while the amplifier 22 is considered as the read amplifier. The read amplifier output serves as an input leg for a gate circuit 23, the latter also having a further input from a read line 24. The output of the gate 23 connects to a suitable storage flip-flop 25, the latter of which is adapted to be set either by the application of a signal fed through the gate 23 or by a further set line 26. The flip-flop 25 has a pair of outputs 27 and 28. The line 27 is adapted to be connected to some external utilization circuitry while the output 28 is adapted to be connected to the input of a write gate 29, the latter having a further input from a write signal line 30. The output of the gate 29 connects to the input of the write amplifier 21.

In a similar manner, the wire $S_2$ is connected to a pair of amplifiers 31 and 32 which correspond to the amplifiers 21 and 22 associated with the wire $S_1$. Further the amplifier 32 connects to a read gate 33 having a gate leg connected to the read line 24. The gate 33 has an output which is adapted to set a further flip-flop 35. A further set line is provided for the flip-flop 35 at line 36. The flip-flop 35 has a pair of outputs 37 and 38, the latter functioning in the same manner as the outputs 27 and 28 in the flip-flop 25. A write gate 39 is provided for supplying a signal to the write amplifier 31.

The wire $S_3$ has a further set of control circuits associated therewith corresponding to those associated with the wires $S_1$ and $S_2$. Thus, there are provided a write amplifier 41 and a read amplifier 42. The output of the read amplifier 42 connects to a read gate 43 the latter of which has an output leading to a flip-flop 45 which is adapted to be set by a signal fed through the gate 43. The flip-flop 45 is also adapted to be set by the wire 46. The flip-flop 45 has outputs 47 and 48 with the output 48 connecting to a suitable write gate 49. The output of the gate 49 connects to the input of the write amplifier 41.

The wire $S_4$ also has a control circuit associated therewith which corresponds to that of the other wires $S_1$, $S_2$ and $S_3$. In this case the corresponding components are identified by the numerals 51—59.

More specifically, there are provided for the wire $S_4$ a pair of amplifiers 51 and 52. The read amplifier 52 connects to a read gate 53 and the output of the read gate connects to a flip-flop 55. A further set line 56 is provided to the flip-flop 55. The output lines 57 and 58 of the flip-flop 55 are provided, with the line 58 being connected to the input of the write gate 59. The output of the gate 59 is adapted to supply a signal to the input of the write amplifier 51.

As pointed out above, it is desirable to provide more than one data selection in the storage array 10 at one time. It will be appreciated that in the normal data processing machine utilizing the principles of the present invention the array 10 is representative of only a single plane of a multi-plane storage system. However, by the proper arrangement of the select wires and control wires for each plane it is possible to make a simultaneous selection in a large number of planes corresponding to the array 10.

When the circuit of the present invention is used with a data processing system having a single arithmetic unit, it may be desirable to select only two groups of data from the high speed memory at one instant. The two groups selected may comprise the two operands to be used in a mathematical computation such as addition or subtraction. In describing the operation of the present circuit it is assumed that the two operands are to be selected from the memory and that these operands are located in the memory at the cores defined by the core positions 11 and 14. In order to select the data stored at the core location 11 it is necessary that the selection wires $X_1$ and $Y_1$ be simultaneously activated by their respective select pulse sources 16 and 18. When the select pulses source 16 and 18 produce a plus one-half select current on the wires $X_1$ and $Y_1$ respectively, the core 11 will be switched to its reset state, if it had previously been placed in the set state. The switching of the core 11 will induce a signal in the wire $S_1$ and this signal will pass through amplifier 22 to one of the gate legs of the read gate 23. When a reading operation is taking place, the read line 24 will be active and consequently the gate 23 will be open so that the set pulse will pass through the gate and set the flip-flop 25 to indicate that a "one" has been read from core 11. At the same time that the core 11 is being read it is desired to read the core 14. It will be noted that the reading of the core 14 can be effected by the simultaneous application of plus one-half select current to each of the wires $X_2$ and $Y_2$ by the select pulse source 17 and 19 respectively. If the core 14 is in the set state at the time that the select signals are applied thereto by way of the select lines $X_2$ and $Y_2$, the core 14 will be switched back to the reset state and will induce a signal in the wire $S_4$. A signal in the wire $S_4$ will feed through the amplifier 52 to the read gate 53 and, with read line 24 active, the flip-flop 55 will be set to indicate that a "one" was stored in the core 14.

It will be noted that while information from the cores 11 and 14 was desired, the memory is so arranged that it will also read out information from the core locations 12 and 13. The read out will be effective to set the flip-flops 35 and 45 respectively if the cores 12 and 13 had been in the set state at the time that the read operation is taking place in the cores 11 and 14. While the core locations 12 and 13 have been read, the information from these cores will be stored in their respective flip-flops and the outputs of the flip-flops will not be utilized in the associated data processing equipment.

It will thus be apparent that the data from the cores 11 and 14 will be available on the output lines 27 and 57 of the flip-flops 25 and 55 respectively. Thus, by using this selection circuitry on a number of planes, two operands for an arithmetic operation or the like may be available for external use.

In order to place the information in the flip-flops 25, 35, 45 and 55 back into the array 10 it is necessary to supply the circuit with a write signal on the write line 30. When this takes place any flip-flop which has been switched into the set state will condition one of the gate legs of the write gates 29, 39, 49 and 59. The write signal on the write line 30 will condition the other gate legs of the write gates so that the signal will be supplied to the write amplifiers 21, 31 41 and 51, respectively. As pointed out above, whenever a writing operation takes place, a minus one-half select current will be applied to the horizontal and vertical selection wires utilized. Thus, the wires $X_1$, $X_2$, $Y_1$ and $Y_2$ will all have a minus ½ select current applied thereto so that at the intersection of these wires the core so located will receive a full select current capable of switching the core. At the same time, a plus one-half select current is applied by way of the write wire W from the write pulse source 20. This plus one-half select current will be applied to all of the cores of the array including the cores 11, 12, 13 and 14. If any core is to be changed from a reset state to a set state it is necessary that the effect of this plus one-half write signal on the write wire W be cancelled out and this is effected by way of the wires $S_1$, $S_2$, $S_3$ and $S_4$. Thus if a flip-flop 25 has been set so that the output line 28 is active, the presence of a write signal from the line 30 will produce an output on the write gate 29 and the amplifier 21 will produce a minus one-half select current which will be effective to cancel the plus one-half current flowing by way of the write wire W. Thus the currents from the select wires $X_1$ and $Y_1$ will switch the core 11 to its set state.

In a similar manner the setting of the cores 12, 13 and 14 will be effected by signals being passed through the respective write amplifiers 31, 41 and 51. If nothing is to be written into the particular core and the core is to be left in the reset state, the respective write amplifiers will not pass a negating half current signal through the associated wires in the set.

It will further be apparent that the circuitry is adapted so that the data may be selected from the core locations 12 and 13 or also from any other combination of core locations as desired. It is then but necessary to control the selection of the information from the output flip-flops of the circuit so that the desired information will be sent to the associated data processing machine.

Figure 3:
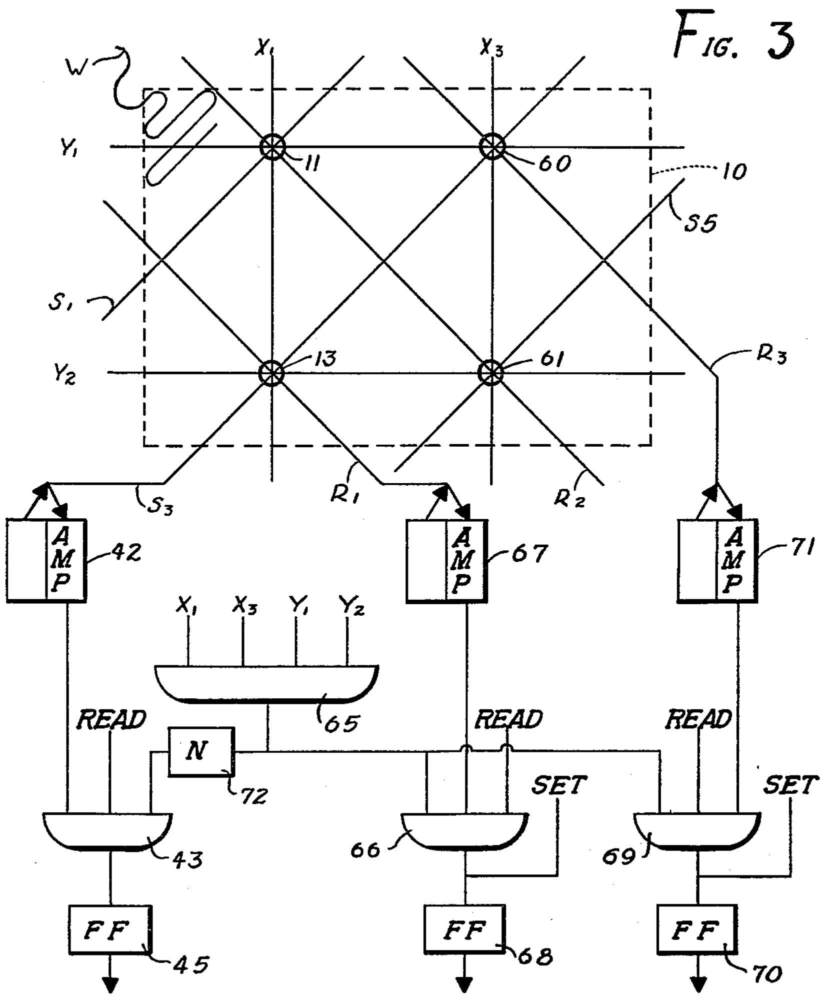
FIGURE 3 illustrates diagrammatically a modification of the circuit of FIGURE 1.

While the circuit illustrated in FIGURE 1 is capable of transferring data simultaneously to or from four cores, it requires a separate sense winding for each core with its associated amplifier circuitry. In order to reduce the number of sense windings required, a single sense winding may thread more than one core. In the latter case, care must be taken to prevent the superposition of data from the threaded cores on the single sense winding. This situation is illustrated in FIGURE 3 where a particular address selection may produce a superposition of information on the wire $S_3$. In other words, it is assumed that with a particular address selection one wire of a set which includes $S_3$ passes through two of the cores selected so that it is impossible to determine on that one wire the information from the two cores which are selected.

It is assumed here that the core array 10 is the same as the core array of FIGURE 1. However, it is assumed that a different horizontal selection wire $X_3$ threads the cores 60 and 61 which are further intercepted by the vertical selection wires $Y_1$ and $Y_2$, respectively. It is further assumed that the wire $S_3$ passes through the core 13 and the core 60 which are at the intercept points $X_1$, $Y_2$ and $X_3$, $Y_1$ respectively. With the wire $S_3$ passing through the cores 13 and 60, it will be apparent that with the selection signals being applied to the selection wires shown both the cores 13 and 60 will induce signals in the wire $S_3$. Consequently, some steps must be taken to eliminate this signal superposition in order that the circuit be usable. The effect of the signal superposition may be eliminated by placing a further compatible set of wires $R_1$, $R_2$ and $R_3$ on the cores of the array 10 such that the slope of the compatible set is equal to, but with opposite sign, when compared with the other set associated therewith as defined by the wires $S_1$, $S_3$ and $S_5$.

A further addition to the circuit of FIGURE 3 is a means for sensing when a superposition of signals will occur upon a particular address selection. This signal superposition check is made by a suitable gating circuit 65 which has on the input gate legs thereof the four main horizontal and vertical select wires used in selecting the cores 13 and 60. Thus, if there is a select signal on the horizontal select wires $X_1$ and $X_3$ and the vertical select wires $Y_1$ and $Y_2$, the gate 65 will have an output which is adapted to be applied to a read gate 66. This read gate will be open if a signal is read from the core 13 onto the output wire $R_1$ by way of a read amplifier 67. Thus, when a read signal is present on the gate 66, the output of the gate is adapted to set a flip-flop 68, which may function in the same manner as the flip-flops of FIGURE 1. In a similar manner, the check gate 65 will supply an activating signal to a read gate 69 which will set a flip-flop 70 if an appropriate signal is received by way of the output line $R_3$ and a read amplifier 71.

In addition to providing for the gating into activation of the read gates 66 and 69 it is essential that the gate 65 provide a signal to prevent any read out into the flip-flop 45. This is accomplished by taking the output of the check gate 65 and passing it through a negation type amplifier 72 to activate the read gate 43 whenever there is no address selection which will cause a superposition of signals on the wire $S_3$. If there is a possibility of superposition, so that there is a signal output from the gate 65, it is desired that the gate leg on the output of the amplifier 72 be down so that the gate 43 is closed and the flip-flop 45 can not be set.

Figure 4:
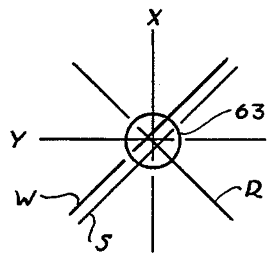
FIGURE 4 illustrates a single core element from the circuit of FIGURE 3 with its associated wires.

The wires which intercept each core in the array, as shown in FIGURE 3, are further illustrated in FIGURE 4. Thus, a core 63 has passing therethrough the horizontal select wire X, the vertical select wire Y, the write wire W, the wire S, and the wire R. The controlling of the setting of the core 63 in the writing operation will be a direct function of the signal applied either to the wire S, or the wire R.

The writing back of information into the cores 13 and 60 will be in the manner described in conjunction with FIGURE 1. However, since these cores are both on the wire $S_3$, it is necessary that the gate 65, or another gate activated by this selection, be used to control the write gate feeding the write amplifier used to write data back to the wires $R_1$ and $R_3$.

It will be apparent that while additional circuitry is required in both FIGURES 1 and 3 in order to achieve the simultaneous selection in all cores of the array, this additional external circuitry can readily be tolerated particularly where simultaneous selection is required in order to achieve a speed of operation in the high speed memory which is compatible with the speed at which the data is required by the memory or needs to be stored by other computing or processing circuitry. It will further be apparent that the apparatus is equally useful in writing a single operand into several positions in the array at the same time. Thus, in any one multi-planed storage array, a single operand could be stored in the core locations 11 and 13. Similarly, a second operand whose length exceeded the number of planes in a single core position could be likewise positioned in two locations such as at the core locations 12 and 14. The write-in and read-out of this information may be achieved in a single operation which may take place at the same time that a single operand is being selected with respect to the locations 11 and 13.

While, in accordance with the provisions of the statutes, there have been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure Letters Patent is:

1. Apparatus for simultaneously switching a plurality of bistable magnetic elements in an array of such elements from one bistable state to the other, comprising a pair of select windings uniquely common to said selected elements, a third winding common to all the elements of said array, a fourth winding common to each of said elements which are to be switched, and a plurality of signal pulse producing means, each of said windings being uniquely connected to a separate one of said pulse producing means, each of said pulse producing means comprising means to limit the signal pulses produced thereby to a half select signal which by itself is of a magnitude less than that required to change the bistable state of said element but when acting with the signals from the others will switch said element if the net signal is a full signal.

2. Apparatus for switching a bistable magnetic element in a memory matrix from one bistable state to the other comprising a pair of select windings uniquely common to said element, a third winding common to said element and all other elements of the matrix, a fourth winding common to said element, a plurality of signal pulse producing means each uniquely connected to a separate one of said windings, each of said signal means comprising means to limit the signal pulses produced thereby to a half select signal which by itself is of a magnitude less than that required to change the bistable state of said element but when acting with the signals from the others will switch said element if the net signal is a full signal, and a storage register connected to said fourth winding to transfer signals in both directions therebetween.

3. A memory matrix comprising a plurality of bistable storage elements arranged in rows and columns in said matrix, a plurality of vertical and horizontal selection wires arranged on said matrix so that each storage element is uniquely defined by the intersection of one horizontal and one vertical selection wire, signal sources connected to said selection wires, means for activating said signal sources to energize at least two horizontal and two vertical selection wires at one instant to thereby select at least four storage elements in said matrix, a compatible set of select wires positioned in said matrix so that each wire of said set is common to a plurality of cores in said matrix but is unique to only one storage element in each row and column in said matrix, storage means connected to said compatible set for storing data to be written into said matrix and data to be read from said matrix, and a write wire positioned in said matrix common to all of said storage elements, and means for pulsing said write wrie when data is to be written into said matrix.

4. A memory matrix comprising a plurality of bistable storage elements arranged in rows and columns in said matrix, a plurality of vertical and horizontal selection wires arranged on said matrix so that each storage element is uniquely defined by the intersection of one horizontal and one vertical selection wire, signal sources connected to said selection wires and adapted to be activated so that at least two horizontal and two vertical selection wires are activated at one instant to thereby select at least four storage elements in said matrix, a first compatible set of select wires positioned in said matrix so that each set wire is unique to only one storage element in each row and column in said matrix, storage means connected to said compatible set and adapted to store data to be written into said matrix and data to be read from said matrix, a second compatible set of wires positioned in said matrix so that each set wire is unique to only one storage element in each row and column in said matrix, said second compatible set having a slope equal to that of said first compatible set but of opposite sign, and a write wire positioned in said matrix common to all of said storage elements, said write wire being adapted for energization when data is to be written into said matrix.

5. A memory matrix comprising a plurality of bistable storage elements arranged in rows and columns in said matrix, a plurality of vertical and horizontal selection wires arranged on said matrix so that each storage element is uniquely defined by the intersection of one horizontal and one vertical selection wire, signal sources connected to said selection wires and adapted to be activated so that at least two horizontal and two vertical selection wires are activated at one instant to thereby select at least four storage elements in said matrix, a first compatible set of select wires positioned in said matrix so that each set wire is unique to only one storage element in each row and column in said matrix, storage means connected to said compatible set and adapted to store data to be written into said matrix and data to be read from said matrix, a second compatible set of select wires positioned in said matrix so that each set wire is unique to only one storage element in each row and column in said matrix, said second compatible set having a slope equal to that of said first compatible set but of opposite sign, a signal superposition checking gate adapted to be activated by signals used on said vertical and horizontal selection wires, said checking gate being connected to control the selection of said first or second compatible sets, and a write wire positioned in said matrix common to all of said storage elements, said write wire being adapted for energization when data is to be written into said matrix.

6. Apparatus for switching bistable magnetic elements in a matrix of similar elements requiring at least a threshold level of excitation to change magnetic states, comprising first and second windings uniquely associated with each of said elements, a third winding associated with a plurality of said elements in a manner where it is unique to only one element associated with each of said first and second windings, a plurality of signal means each connected to one of said windings and respectively adapted to excite said windings in one direction to substantially half said threshold level, a fourth winding associated with each element of said matrix, and signal means connected to said fourth winding to excite the latter in the opposite direction to substantially one-half said threshold level.

7. Apparatus for simultaneously switching a plurality of bistable elements in a matrix of similar elements each requiring at least a threshold level of excitation to change stable states, first and second groups of excitation means, each of said elements being uniquely associated with a pair of excitation means taken from said first and second groups, a third group of excitation means each uniquely associated in a first sense with only one associated element of each of said first and second groups, a fourth group of excitation means each uniquely associated in the opposite sense with only one associated element of each of said first and second groups, a plurality of means respectively adapted to energize one of said excitation means in a first direction to substantially half said threshold level, a single excitation means associated with each of said elements, and means for energizing said single excitation means in the opposite direction to substantially half said excitation level.

8. Apparatus for simultaneously switching a plurality of bistable elements in a matrix of similar elements each requiring at least a threshold level of excitation to change states, first and second groups of windings, each of said elements being uniquely associated with a pair of windings from said first and second groups, a third group of windings each uniquely associated with only one associated element of each of said first and second groups, a plurality of signal means each connected to one of said windings and respectively adapted to excite the latter in one direction to substantially half said threshold level, a single winding associated with each of said elements, and signal means connected to said single winding to excite the latter in the opposite direction to substantially half said threshold level.

References Cited in the file of this patent

UNITED STATES PATENTS

| | | |
|---|---|---|
| 2,691,155 | Rosenberg et al. | Oct. 5, 1954 |
| 2,691,156 | Saltz et al. | Oct. 5, 1954 |
| 2,734,184 | Rajchman | Feb. 7, 1956 |
| 2,736,880 | Forrester | Feb. 28, 1956 |
| 2,784,391 | Rajchman et al. | Mar. 5, 1957 |
| 2,824,294 | Saltz | Feb. 18, 1958 |
| 2,914,617 | Fritischi et al. | Nov. 24, 1959 |
| 2,915,740 | Ricketts et al. | Dec. 1, 1959 |
| 2,931,014 | Buchholz et al. | Mar. 29, 1960 |
| 2,932,451 | Beattie et al. | Apr. 12, 1960 |
| 2,965,883 | Miller | Dec. 20, 1960 |
| 3,001,710 | Haynes | Sept. 26, 1961 |
| 3,007,642 | Lee | Nov. 7, 1961 |
| 3,015,443 | Miller | Jan. 2, 1962 |
| 3,066,283 | Davis | Nov. 27, 1962 |
| 3,069,086 | Papo | Dec. 18, 1962 |

FOREIGN PATENTS

| | | |
|---|---|---|
| 769,384 | Great Britain | Mar. 6, 1957 |

OTHER REFERENCES

Publication I: "Multiple Coincidence Magnetic Storage Systems," Journal of Applied Physics, vol. 26, No. 5, May 1955, pages 575–579, by Minnick and Ashenhurst.